(12) United States Patent
Bassett et al.

(10) Patent No.: US 10,140,231 B2
(45) Date of Patent: Nov. 27, 2018

(54) FLEXIBLE PORT CONFIGURATION BASED ON INTERFACE COUPLING

(75) Inventors: Jonathan D. Bassett, Fort Collins, CO (US); Raphael Gay, Fort Collins, CO (US); Linden H. McClure, Milliken, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 266 days.

(21) Appl. No.: 14/374,681

(22) PCT Filed: Jan. 31, 2012

(86) PCT No.: PCT/US2012/023347
§ 371 (c)(1),
(2), (4) Date: Jul. 25, 2014

(87) PCT Pub. No.: WO2013/115798
PCT Pub. Date: Aug. 8, 2013

(65) Prior Publication Data
US 2015/0205740 A1     Jul. 23, 2015

(51) Int. Cl.
*G06F 13/38* (2006.01)
*G06F 13/40* (2006.01)
*G06F 13/42* (2006.01)

(52) U.S. Cl.
CPC ........ *G06F 13/4004* (2013.01); *G06F 13/385* (2013.01); *G06F 13/4022* (2013.01); *G06F 13/4081* (2013.01); *G06F 13/4221* (2013.01)

(58) Field of Classification Search
CPC .............. G06F 13/4004; G06F 13/385; G06F 13/4022; G06F 13/4081; G06F 13/4221
USPC .......................................................... 710/104
See application file for complete search history.

(56) References Cited

U.S. PATENT DOCUMENTS

| | | | | | |
|---|---|---|---|---|---|
| 4,296,465 | A | * | 10/1981 | Lemak | G06F 12/0866 710/316 |
| 4,835,737 | A | * | 5/1989 | Herrig | H05K 7/1414 710/302 |
| 5,317,697 | A | * | 5/1994 | Husak | G06F 13/4072 370/217 |
| 5,418,911 | A | * | 5/1995 | Zilka | G06F 13/4022 326/56 |
| 5,467,344 | A | * | 11/1995 | Solomon | H04L 12/6418 370/396 |
| 5,619,660 | A | * | 4/1997 | Scheer | G06F 13/409 361/737 |

(Continued)

FOREIGN PATENT DOCUMENTS

CN   101387944      3/2009
TW   200639686 A   11/2006
(Continued)

OTHER PUBLICATIONS

PCI Express Base Specification Revision 3.0 Nov. 10, 2010.*
(Continued)

*Primary Examiner* — P. R. Myers
(74) *Attorney, Agent, or Firm* — Trop Pruner & Hu PC (57) ABSTRACT

Example embodiments disclosed herein relate to configuring a flexible port. The configuration of a computing device is detected based on a coupling of an interface to a flexible input/output port. The flexible input/output port is configured based on the detected configuration of the computing device.

10 Claims, 9 Drawing Sheets

(56) References Cited

U.S. PATENT DOCUMENTS

| | | | |
|---|---|---|---|
| 5,627,416 A * | 5/1997 | Kantner | H01R 27/00 307/119 |
| 6,085,260 A | 7/2000 | Nelson | |
| 6,138,194 A * | 10/2000 | Klein | G06F 13/4081 361/679.4 |
| 6,151,647 A * | 11/2000 | Sarat | G06K 7/0008 710/104 |
| 6,298,408 B1 | 10/2001 | Park | |
| 6,661,236 B2 * | 12/2003 | Goers | G06F 13/4081 324/537 |
| 6,886,057 B2 * | 4/2005 | Brewer | G06F 13/385 710/11 |
| 6,895,447 B2 * | 5/2005 | Brewer | G06F 13/385 710/11 |
| 7,069,369 B2 * | 6/2006 | Chou | G06F 13/385 710/301 |
| 7,248,597 B2 | 7/2007 | Kim | |
| 7,254,650 B2 * | 8/2007 | Lin | G06K 7/0008 710/10 |
| 7,493,437 B1 * | 2/2009 | Jones | G06F 13/38 710/301 |
| 7,827,337 B2 * | 11/2010 | Jeong | G06F 13/385 710/113 |
| 7,836,236 B2 * | 11/2010 | Chou | G06F 13/385 710/11 |
| 7,925,812 B2 | 4/2011 | Konno et al. | |
| 7,987,308 B2 * | 7/2011 | Jo | G06F 13/387 365/63 |
| 8,301,822 B2 * | 10/2012 | Pinto | G06F 3/0607 710/305 |
| 8,756,360 B1 * | 6/2014 | Richard | G06F 13/4022 710/316 |
| 2002/0111771 A1 * | 8/2002 | Huang | G06F 13/4081 702/186 |
| 2003/0135680 A1 * | 7/2003 | Peacock | G06F 1/184 710/301 |
| 2003/0229739 A1 | 12/2003 | Brewer et al. | |
| 2005/0102454 A1 * | 5/2005 | McAfee | G06F 13/4022 710/107 |
| 2005/0210177 A1 * | 9/2005 | Norden | G06F 13/4022 710/317 |
| 2006/0114918 A1 * | 6/2006 | Ikeda | H04L 45/02 370/408 |
| 2008/0003845 A1 | 1/2008 | Hong et al. | |
| 2008/0151753 A1 * | 6/2008 | Wynne | H04L 49/90 370/235 |
| 2009/0006708 A1 * | 1/2009 | Lim | G06F 13/4022 710/314 |
| 2009/0077295 A1 | 3/2009 | Konno et al. | |
| 2009/0228730 A1 | 9/2009 | Chin | |
| 2011/0072185 A1 | 3/2011 | Pinto et al. | |
| 2012/0059957 A1 * | 3/2012 | Millsaps | H04L 49/35 710/46 |
| 2012/0166701 A1 * | 6/2012 | Oh | G06F 13/385 710/315 |
| 2013/0262728 A1 * | 10/2013 | Wong | G06F 13/4081 710/302 |

FOREIGN PATENT DOCUMENTS

| | | |
|---|---|---|
| TW | M405104 | 6/2011 |
| TW | 201126347 A | 8/2011 |

OTHER PUBLICATIONS

EP ~ Extended Search Report ~ Appiication No. 12867016 3-1953/ 2810173 dated Oct. 12, 2015 ~ 6 pages.
International Search Report and Written Opinion, International Application No. PCTIUS2012/023347, dated Oct. 23, 2012, pp. 1-7.

* cited by examiner

FLEXIBLE PORT CONFIGURATION BASED ON INTERFACE COUPLING

BACKGROUND

Computing devices today are configured with various Input/Output interfaces. Examples of these interfaces include Peripheral Component Interconnect buses, Universal Serial Buses, and Serial Advanced Technology Attachment buses. An Input/Output Controller can be used to interface between these interfaces and a processor of a computing device.

BRIEF DESCRIPTION OF THE DRAWINGS

The following detailed description references the drawings, wherein:

FIGS. 4A-4D are diagrams of computing systems capable of detecting a system configuration based on using a daughter card interface, according to various examples;

DETAILED DESCRIPTION

Many computing systems today are configured to use various Input/Output (I/O) interfaces. Manufacturers use particular hardware, such as processors, I/O Controllers, etc. in their devices. Many of these I/O Controllers permanently define the I/O port types that can be used. Other I/O Controllers allow for flexible ports where one or more of the ports can be configured. In certain embodiments, a flexible port is a set of I/O connectors (e.g., pins, balls, etc.) of an I/O controller that can be used to provide a first I/O interface using a first protocol or a second I/O interface using a second protocol. Additional I/O connectors of the I/O controller can be used to implement the first I/O interface or the second I/O interface. In one example, some I/O Controllers may allow a set of pins associated with the hub to be used as a Universal Serial Bus (USB) port, a Peripheral Component Interconnect Express (PCIe) port, a Serial Advanced Technology Attachment (SATA) port, or other ports. This allows a chip manufacturer to reduce the variations of chips that it makes because another chip design need not be used to support the varying ports.

Manufacturers develop printed circuit assemblies (PCAs), such as system boards, to work with I/O controllers and/or processors associated with the hubs. When a PCA is assembled, manufacturers may set the flexible ports to permanently define I/O port types to be used. This may be done because supporting hardware would be connected via a printed circuit board and this hardware and/or wire routing would be specialized for particular ports. However, this approach is not very expandable and can be difficult to customize for a particular user's or system's needs. Further, configuring the ports using user intervention can be time consuming and undesirable for a user.

Accordingly, various embodiments disclosed herein relate to detecting a desired I/O configuration of a computing device and configuring a flexible port. The detection of the configuration can include detection based on the coupling of an interface to the flexible port. In one embodiment, detection based on the coupling of an interface to the flexible port means that the connection of a component to at least the signals of the flexible port is used to detect the configuration. In one example, the coupling of the interface can also include a coupling of a general purpose input/output (GPIO) of the interface connection. In certain embodiments, a GPIO is a generic connector (e.g., a pin) on a chip whose behavior can be controlled using software executable by a controller. Further, in some embodiments, the interface is connected internal to the computing device, while in other embodiments, the interface is connected external to the computing device.

Figure 1A:
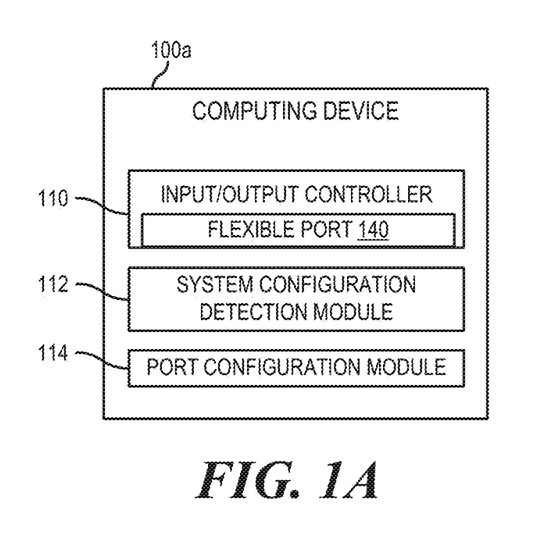
FIGS. 1A and 1B are block diagrams of computing devices capable of configuring a flexible port based on a detected system configuration, according to various examples.
Figure 1B:
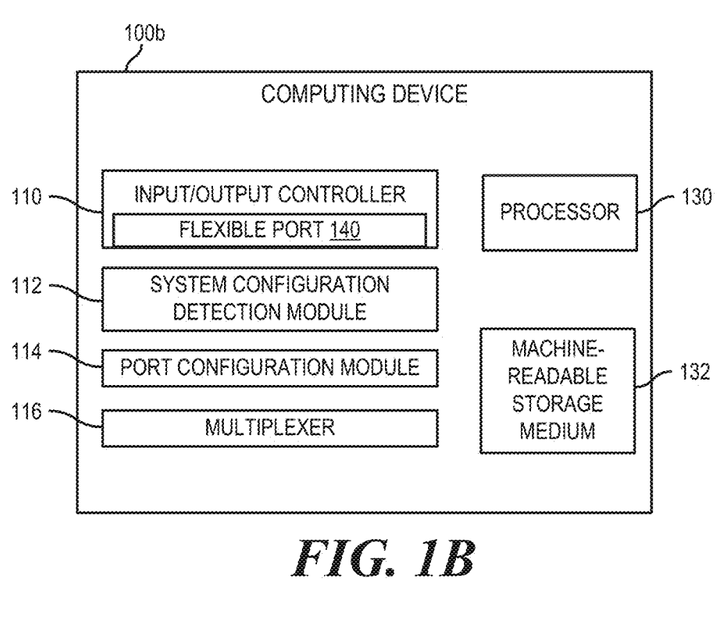

Referring now to the drawings, FIGS. 1A and 1B are block diagrams of computing devices capable of configuring a flexible port based on a detected system configuration, according to various examples. Computing devices 100a, 100b include components that can be utilized to configure flexible ports based on a system configuration. The respective computing devices 100a, 100b may be a notebook computer, a desktop computer, a server, a workstation, or any other computing device that may use one or more flexible ports. In certain embodiments, computing device 100a may include an input/output controller 110, a system configuration detection module 112, and a port configuration module 114. In another embodiment, computing device 100b can also include a multiplexer 116, a processor 130, and a machine-readable storage medium 132. The input/output controller 110 can include a flexible port 140.

In certain embodiments, the input/output controller 110 is a chip that can connect peripheral components to a processor. In certain examples, the I/O controller 110 can be called a Southbridge, an I/O Controller Hub, a Fusion Controller Hub, etc. In other examples, the I/O controller 110 can be incorporated as part of a Northbridge or similar chip or chipset.

As noted, the I/O controller 110 can include a flexible port 140. More than one flexible port 140 can be included in the I/O controller 110. As noted, in certain examples, a flexible port 140 is a set of pins of the I/O controller 110 that can be used to provide a first I/O interface using a first protocol or a second I/O interface using a second protocol. Example interfaces include USB, PCIe, SATA, Small Computer System Interface (SCSI), Integrated Drive Electronics (IDE), PCI, etc. The flexible port 140 can be configured to use the first protocol or the second protocol. In certain examples, the port may be configured to be able to use additional protocols and/or interface. For example a single flexible port may be able to support three different types of interfaces.

The system configuration detection module 112 can be used to detect a desired input/output configuration of the computing device 100 based on a coupling of an interface to the flexible port 140. In certain examples, the detection of the desired I/O configuration of the computing device 100 based on the coupling of an interface to the flexible port 140 means that the connection of a component of the computing device 100 to at least the signals of the flexible port 140 associated with a protocol is used to detect the configuration. The configuration can be based on trial and error detection done by the computing device 100 (e.g., performed by a Basic Input Output System (BIOS) of the computing devices) or using a hardware configuration as further described in FIGS. 2A-7B.

In one example, when the computing device 100 boots, the BIOS or other firmware causes the computing device to use trial and error detection. A multiplexer 116 can be used to split one or more signal connectors (e.g., wiring, connections of a Printed Circuit Board (PCB), etc.) of a bus associated with the flexible port 140 to two or more port connectors to avoid conflicts. However, in certain embodiments, the use of a multiplexer is not needed. In certain examples, the multiplexer 116 is external to the I/O controller 110. In other examples, the multiplexer 116 is internal to the I/O controller 110. The port connectors can be used to connect the flexible port 140 with a peripheral device or to another connector leading to the peripheral device. The port connectors can be different types of ports using different types of protocols. Examples of port connector types include SATA, PCIe, IDE, SCSI, and USB. The multiplexer 116 can be controlled using a selection signal to determine which of the port connectors to connect. The multiplexer 116 can also be implemented using one or more transistors that can be turned on/off using a selection signal. When the transistors are turned on, the individual lines of the flexible port 140 are connected to the respective port connector that should be on. The other port connectors connected to the multiplexer 116 and/or transistors to connect to the flexible port 140 can be turned off.

During the boot process, the system configuration detection module 112 can set the flexible port 140 to communicate using a first protocol (e.g., PCIe, USB, SATA, etc.). The multiplexer 116 can also be set to associate the flexible port 140 with a port connector associated with the first protocol. The system configuration detection module 112 can then cause the flexible port 140 to perform a component discovery process based on the first protocol. This discovery process can learn if there is a peripheral device connected to the first port connector and/or is compatible with the first protocol. The port configuration module 114 can configure the flexible port 140 based on the component discovery process. In certain examples, the discovery of the peripheral device to the first port connector leads to an inference that this is the desired I/O configuration of a user/manufacturer of the computing device 100. Such inferences can be programmed into the system configuration detection module 112. In one example, if a peripheral device is found, the port configuration module 114 sets the flexible port 140 to work with the first port connector using the first protocol. In another example, if a peripheral device is not found, the port configuration module 114 can perform another task, for example, set the flexible port 140 to a default configuration and/or set the flexible port 140 based on further discovery.

In one example, the peripheral device is not found using the first protocol. As such, the component discovery process determines that there is an absence of a connected component to the first port. The system configuration detection module 112 configures the flexible port 140 to communicate using a second protocol and/or a second port connector. This can include setting the multiplexer 116 to connect the second port connector to the flexible port. The system configuration detection module 112 can then cause the flexible port 140 to perform a second component discovery process based on the second protocol. The port configuration module 114 can then select the second port connector to connect to the bus associated with the flexible port 140 based on the second component discovery process. For example, the selection of the second port connector can occur if a peripheral device is found on at the second port connector. If no peripheral device is found using the first and/or second port connector, a default condition can be set by the port configuration module 114 (e.g., a setting to the first port connector, a setting to the second port connector, a setting to another port connector, disabling the flexible port, etc.). An inference can be made that the default condition is the desired I/O configuration based on the lack of a peripheral device on the first port connector and/or the second port connector. Further, other iterations of the discovery process, for example, at a third and/or fourth port connector, can be performed. Moreover, multiple flexible ports can be set in this manner.

In certain examples, the system configuration detection module 112 can determine the intended/desired configuration of the flexible port 140 based on other hardware coupling of one or more interfaces to the flexible port 140 as further detailed in FIGS. 2A-7B. Further, in certain embodiments, the system configuration detection module 112 and/or port configuration module 114 can be implemented as part of a Basic Input Output System (BIOS) or other firmware executed by the computing device 100. In some embodiments, the examples of FIGS. 2A-7B can be implemented with the help of a multiplexer. In other embodiments, these examples can be implemented without a multiplexer. In certain examples, a multiplexer can be used to help maintain signal integrity. In other examples, a multiplexer can be used to prevent physical damage to/from a peripheral device connected to the flexible port to/from another peripheral device and/or the flexible port. This may occur, for example, if the electrical characteristics of a protocol associated with the flexible port are different from the electrical characteristics of a connected peripheral device.

A processor 130, such as a central processing unit (CPU) or a microprocessor suitable for retrieval and execution of instructions and/or electronic circuits can be configured to perform the functionality of any of the modules 112, 114 described herein. In certain scenarios, instructions and/or other information, such as port configuration information, can be included in machine-readable storage medium 132 or other memory. Input/output interfaces may additionally be provided by the computing device 100b. For example, input devices, such as a keyboard, a touch interface, a mouse, a microphone, etc. can be utilized to receive input from an environment surrounding the computing device 100b. Further, an output device, such as a display, can be utilized to present information to users. Examples of output devices include speakers, display devices, amplifiers, etc. These input and/or output devices can be configured to be connected via a non-flexible port and/or on the flexible port(s). Moreover, in certain embodiments, some components can be utilized to implement functionality of other components described herein.

Each of the modules 112, 114 may include, for example, hardware devices including electronic circuitry for implementing the functionality described herein. In addition or as an alternative, each module 112, 114 may be implemented as a series of instructions encoded on machine-readable storage medium 132 of computing device 100 and executable by processor 130. It should be noted that, in some embodiments, some modules are implemented as hardware devices, while other modules are implemented as executable instructions.

Processor 130 may be, at least one central processing unit (CPU), at least one semiconductor-based microprocessor, at least one graphics processing unit (GPU), other hardware devices suitable for retrieval and execution of instructions stored in machine-readable storage medium 132, or combinations thereof. For example, the processor 130 may include multiple cores on a chip, include multiple cores across multiple chips, multiple cores across multiple devices (e.g., if the computing device 100 includes multiple node devices), or combinations thereof. Processor 130 may fetch, decode, and execute instructions to implement system detection, configuration, and implementation tasks. As an alternative or in addition to retrieving and executing instructions, processor 130 may include at least one integrated circuit (IC), other control logic, other electronic circuits, or combinations thereof that include a number of electronic components for performing the functionality of one or more modules.

Machine-readable storage medium 132 may be any electronic, magnetic, optical, or other physical storage device that contains or stores executable instructions. Thus, machine-readable storage medium 132 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 132 can be non-transitory. As described in detail herein, machine-readable storage medium 132 may be encoded with a series of executable instructions for performing various tasks, for example, the tasks of FIG. 8.

Figure 2A:
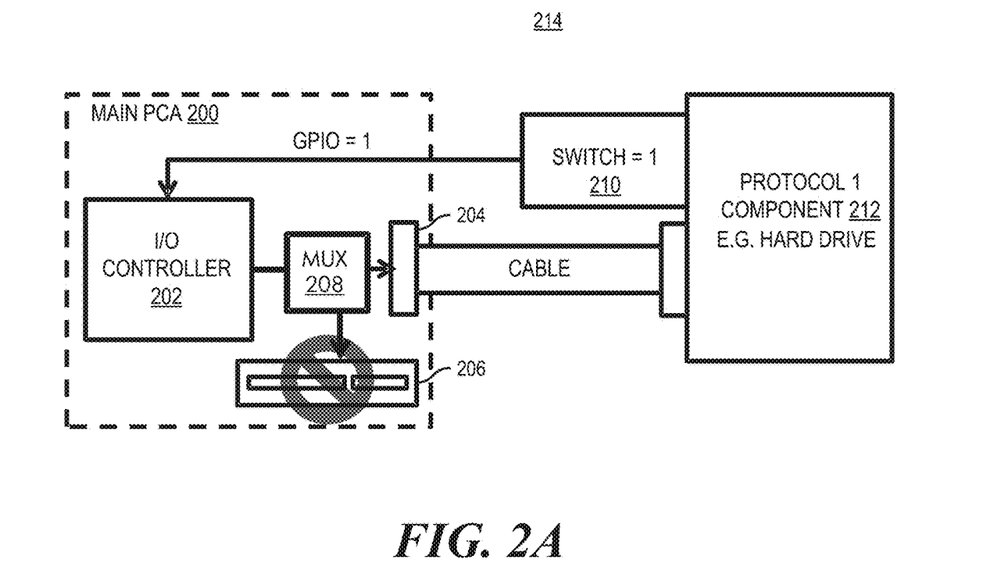
FIGS. 2A and 2B are diagrams of computing systems capable of detecting a system configuration based on a physical detection device, according to various examples.
Figure 2B:
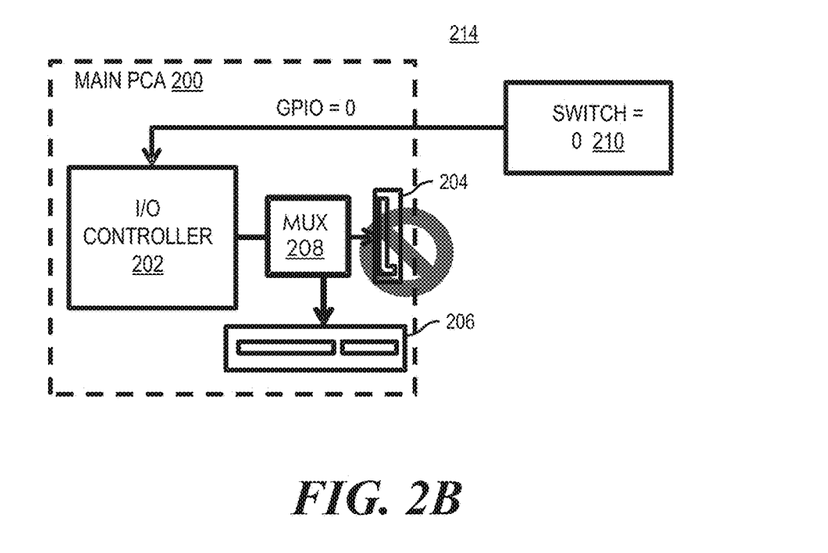

FIGS. 2A and 2B are diagrams of computing systems capable of detecting a system configuration based on a physical detection device, according to various examples. A main system board or PCA 200 can include an I/O controller 202 that has a flexible port (not shown) that is connected to a first port connector 204 and a second port connector 206 via a multiplexer 208. A general purpose input can be connected to a switch 210 that is actuated when hardware, such as a component 212 associated with a first protocol is installed in a computing system 214. In one example, the component 212 is a hard drive, an optical drive, a solid state drive, a hybrid drive, etc. When the component is installed in a drive bay, the switch is actuated, triggering a GPIO to a particular state. The state itself can change depending on implementation. In the example of FIG. 2A, the state is the GPIO=1. This corresponding GPIO can be used to control the flexible port to communicate via the first port connector 204 that has its interface coupled to the component 212. In certain scenarios, the switch 210 and GPIO can be considered as part as the coupling interface because both are physically connected simultaneously. In the example of FIG. 2B, the GPIO=0, indicating that the second port connector 206 is the desired I/O configuration for flexible port. As such, the flexible port can be configured for the second port connector 206 using a second protocol. In one example, the first port connector 204 is a SATA connector and the second port connector 206 is a PCIe slot.

In certain examples, the GPIO can be used to directly control the flexible port on the I/O controller 202. In other examples, the GPIO can be connected to another component, such as a module controlled by a BIOS or other firmware to detect the desired configuration. The module can then be used to program the I/O controller 202. Further, for simplicity, the GPIO states here are shown as 0 and 1, however, it is contemplated that other states (e.g., 00, 01, 10, 11, 000, etc.) can be used as GPIO. Moreover, other input mechanisms can be used. In one example, a multi-level coding can be used on the GPIO. For example, the input can be provided to an analog to digital converter to provide state information. The state information can be based on voltage levels of the input instead of being binary. This can be used to add expandability for PCAs. The diagrams shown in FIGS. 3A-7B can also be implemented in this manner.

Figure 3A:
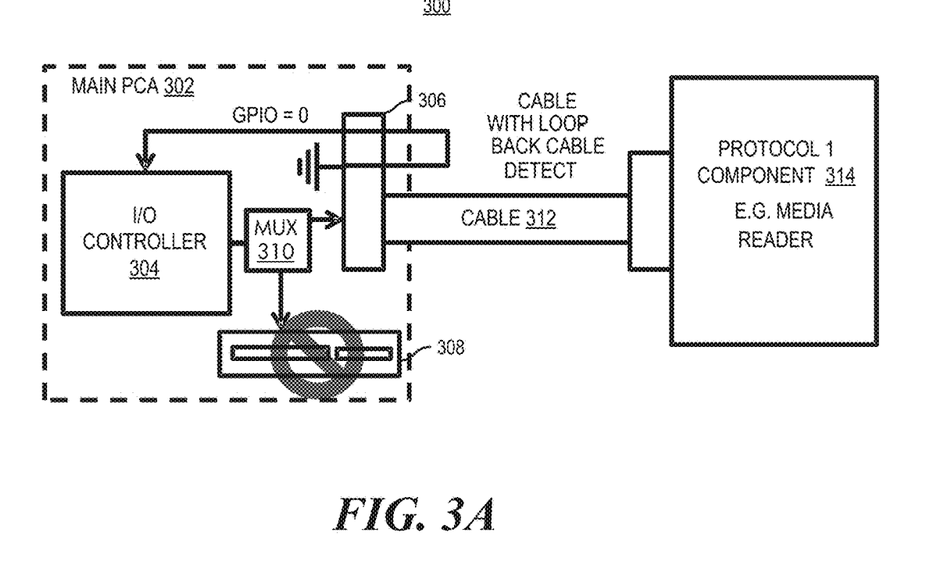
FIGS. 3A and 3B are diagrams of computing systems capable of detecting a system configuration based on cable detection, according to various examples.
Figure 3B:
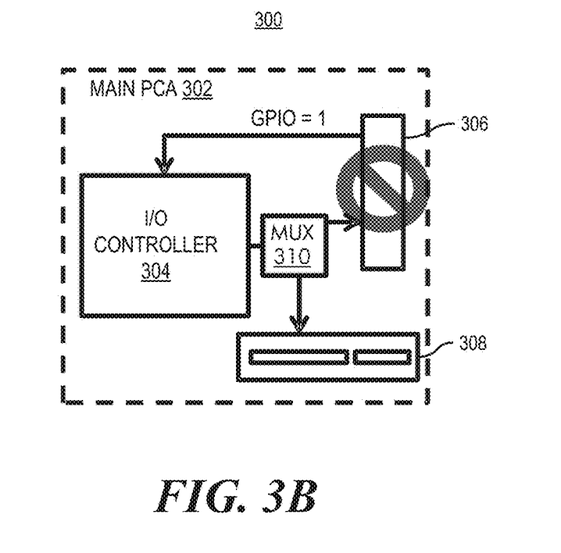

FIGS. 3A and 3B are diagrams of computing systems capable of detecting a system configuration based on cable detection, according to various examples. Computing system 300 includes a main system board or PCA 302 that can include an I/O controller 304 that includes a flexible port that is connected to a first port connector 306 and a second port connector 308 via a multiplexer 310. In this example, the first port connector 306 can be a header. The header can include pins that can be configured to drive a GPIO to a state when a cable 312 is connected. The cable 312 can include a loop back that connects at least two of the header pins together when the cable 312 is connected to the header. The cable coupling with the GPIO as well as the rest of the first port connector 306 can be used to determine the desired input/output configuration of the computing system 300. As noted above, the state of the GPIO used can vary based on implementation. In this example, when the cable 312 is used to connect a component 314 or connector on a chassis to the header, the flexible port is configured for the first protocol, for example, a USB protocol. If the cable 312 is not present, the first protocol and first port connector 306 is disabled and the second port connector 308 associated with a second protocol, for example, PCIe, is enabled.

FIGS. 4A-4D are diagrams of computing systems capable of detecting a system configuration based on using a daughter card interface, according to various examples. Computing system 400 includes a main PCA 402 that can include I/O controller 404 that includes a flexible port (not shown) that is connected to a first port connector 406 and a second port connector 408 via a multiplexer 410. In this example, the first port connector 406 can be considered a board connector that connects to a circuit board, such as daughter PCA 412. The connection of the daughter PCA 412 can change the state of the GPIO used to control the I/O controller 404. As such, when the daughter PCA 412 is connected, the flexible port is configured for the first protocol, for example, a PCIe protocol associated with a PCIe port 414 on the daughter PCA 412. Similarly, if the daughter PCA 412 is not connected, the flexible port can be configured for the second port connector 408 using a second protocol, such as SATA.

Figure 4A:
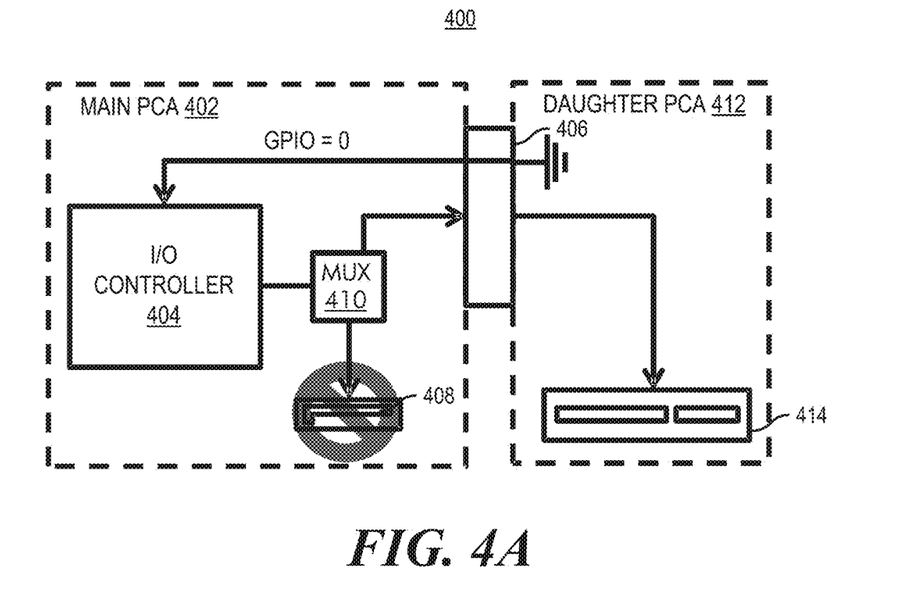
Figure 4B:
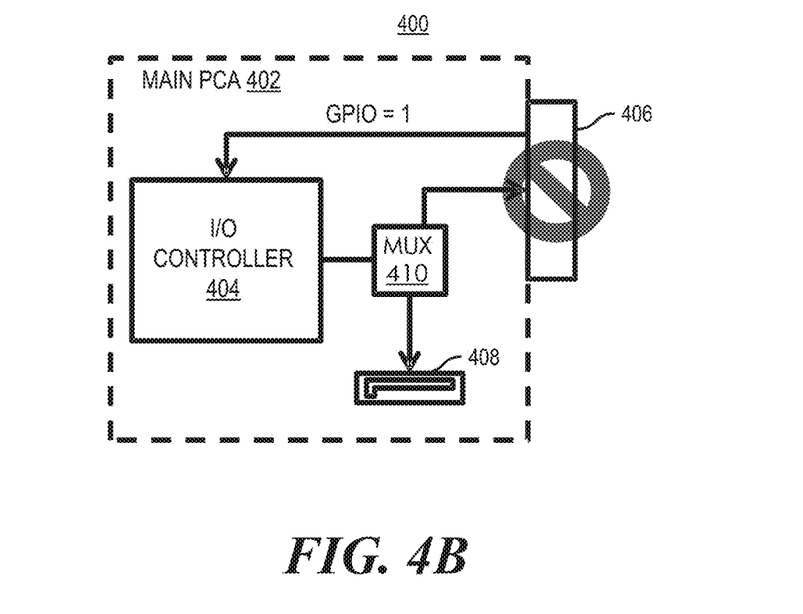
Figure 4C:
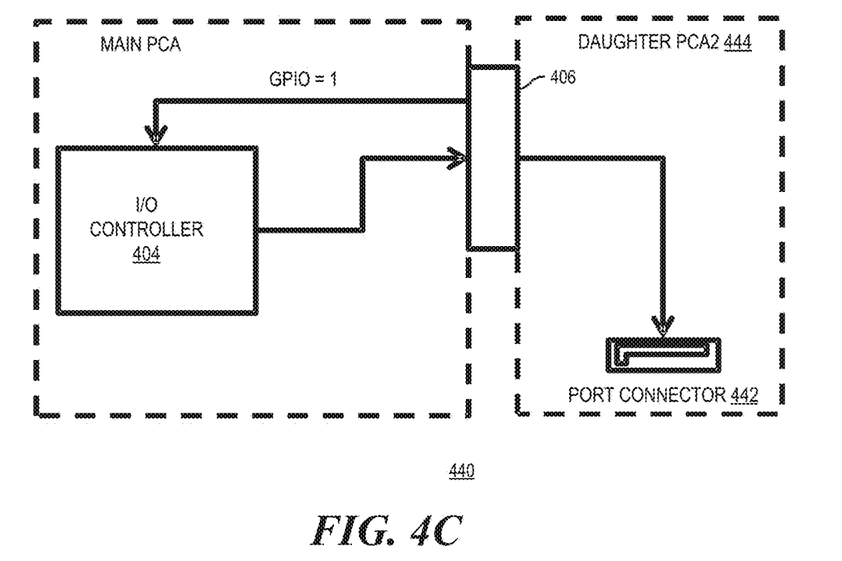

Computing system 440 of FIG. 4C is a modification of FIG. 4B. In this scenario, instead of the second port connector 408 being associated with the main PCA 402, a second port connector 442 can be associated with a second daughter PCA 444. In this scenario, the same port connector 406 can be used to transmit signal information of a second protocol. This can also be based on implementation. For example, when daughter PCA 412 is connected, the GPIO state can be driven to 0, indicating that flexible port and/or a multiplexer should be programmed for the PCIe port 414 to be active. When daughter PCA 444 is installed, the GPIO is at 1. As such, the flexible port can be programmed to be associated with the second port connector 442 on the daughter PCA 444. In one example, this port connector 442 can be configured to be associated with a SATA connection. In other examples, this port connector 442 can be configured to be associated with a USB protocol, Ethernet, Institute of Electrical and Electronics Engineers (IEEE) 1394, etc.

Figure 4D:
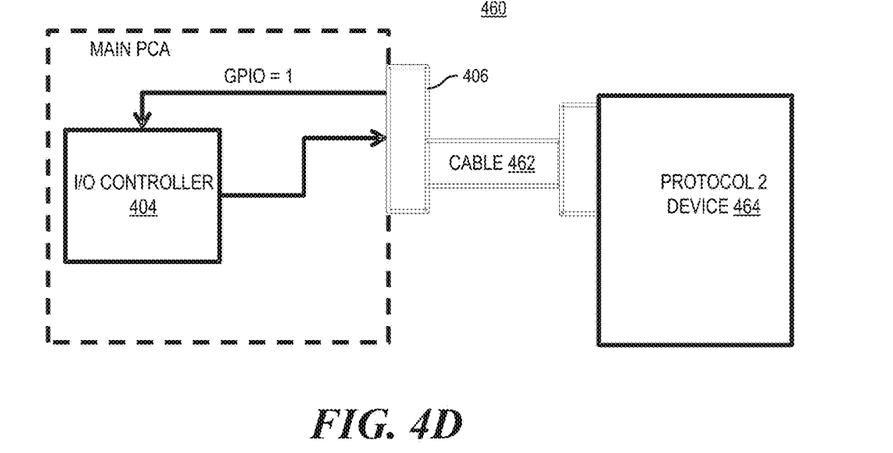

Similarly, system 460 of FIG. 4D shows a configuration where a cable 462 is used to connect a device 464 via the first port connector 406. The GPIO can be controlled based on the cable 462. This example shows the cable 462 causing a GPIO of 1, but it is noted that the cable 462 can be used to cause other states. In this example, connecting the cable 462 tells a system configuration detection module that the intended configuration is to support the protocol associated with device 464. In some examples, one cable or multiple cables can be used to provide access to a port connector on a daughter PCA. Further, a connector cable for one type of interface may be used for connecting another type of interface on the daughter PCA if the specifications of the protocol are met. For example, one or more SATA connectors may be used to connect a PCIe port.

Figure 5A:
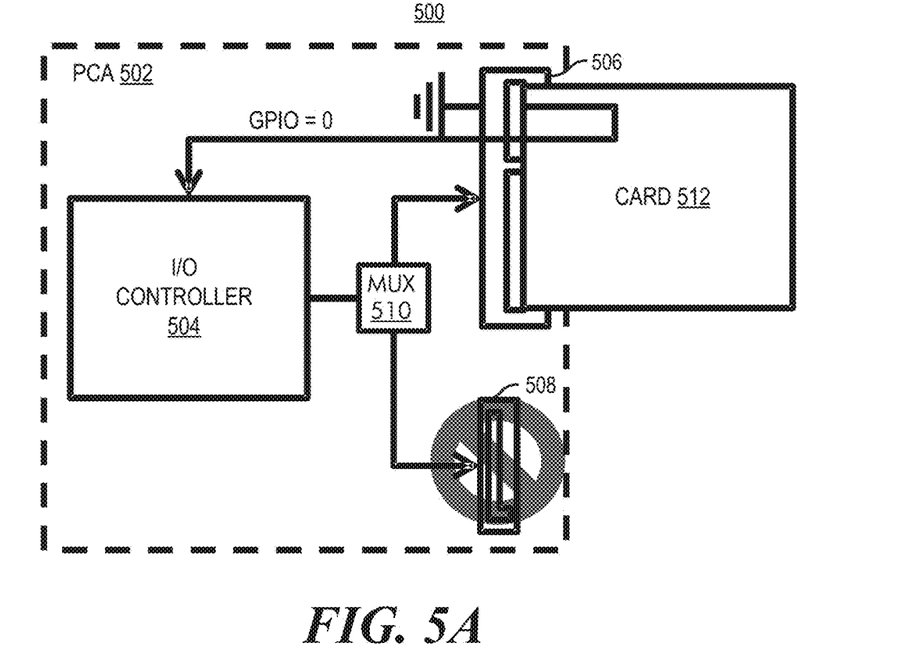
FIGS. 5A and 5B are diagrams of computing systems capable of detecting a system configuration based on the presence of a device, according to various examples.
Figure 5B:
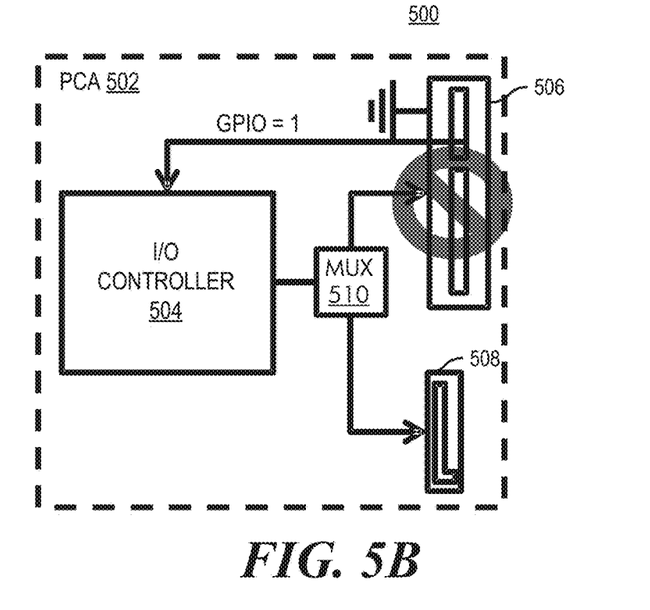

FIGS. 5A and 5B are diagrams of computing systems capable of detecting a system configuration based on the presence of a device, according to various examples. Computing system 500 includes a PCA 502 that can include an I/O controller 504 with a flexible port that is connected to a first port connector 506 and a second port connector 508 via a multiplexer 510. In this example, the first port connector 506 can use the ground plane of a card inserted into the first port connector 506 to determine a GPIO used to set a flexible port of the I/O controller 504. In this example, the first port connector 506 can replace a ground pin associated with a card 512 that can be considered a peripheral device with the GPIO signal. As such, when the card 512 is inserted, the ground plane connects the GPIO to ground. The GPIO is set to 0, which can be a state that a system configuration detection module can associate with activating the flexible port and multiplexer 510 to work with the first port connector 506 using a first protocol. If the card 512 is not inserted, the GPIO can change state to 1 and the second port connector 508 associated with a second protocol can be activated.

Figure 6A:
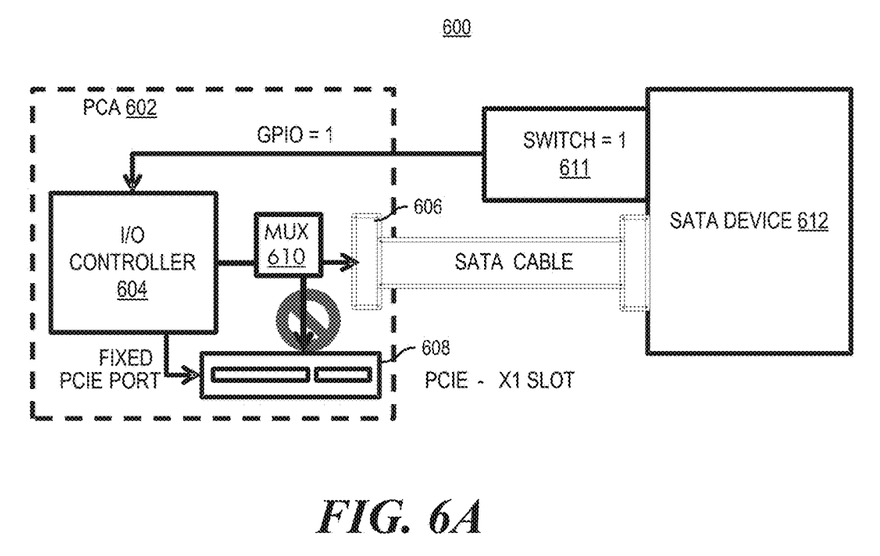
FIGS. 6A and 6B are diagrams of computing systems that can be used to program a flexible port to provide an interface of a particular protocol or provide additional bandwidth to another interface, according to various examples.
Figure 6B:
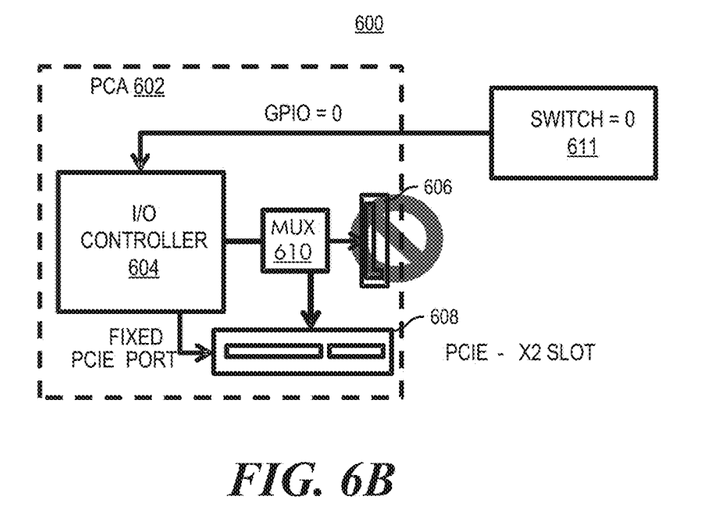

FIGS. 6A and 6B are diagrams of computing systems that can be used to program a flexible port to provide an interface of a particular protocol or provide additional bandwidth to another interface, according to various examples. Computing system 600 includes PCA 602 that can include an I/O controller 604 with a flexible port connected to a first port connector 606 and a PCIe port 608 via a multiplexer 610. In this example, the first port connector 606 is associated with the SATA protocol; however, it is contemplated that other protocols can be used. The computing system 600 shows that the GPIO includes a state that changes based on the coupling of an interface. In this example, the GPIO is triggered using a switch 611 that is actuated when a SATA device 612 is inserted into a device bay, however, other methods of triggering the GPIO are contemplated. When the SATA device 612 is present, the flexible port can be configured to use the first port connector 606 based on the GPIO. In this configuration, the PCIe port 608 can be configured using a fixed port and/or another flexible port of the I/O controller 604. When the SATA device 612 is not present, the GPIO can be used to configure the flexible port to expand bandwidth capacity of the bus associated with the PCIe slot 608. As such, in one example, when the SATA device 612 is present, the PCIe slot 608 is an ×1 slot, but when the SATA device 612 is not present, the PCIe slot 608 is an ×2 slot. Similar bandwidth expansion may be used for other protocols and connectors.

Figure 7A:
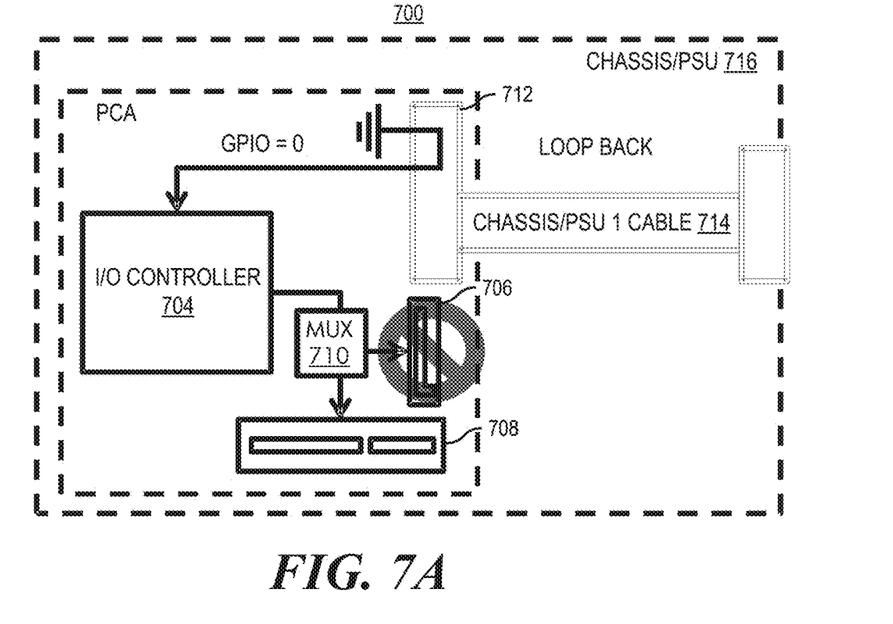
FIGS. 7A and 7B are diagrams of computing systems capable of detecting a system configuration based on the presence of a chassis or power supply, according to various examples.
Figure 7B:
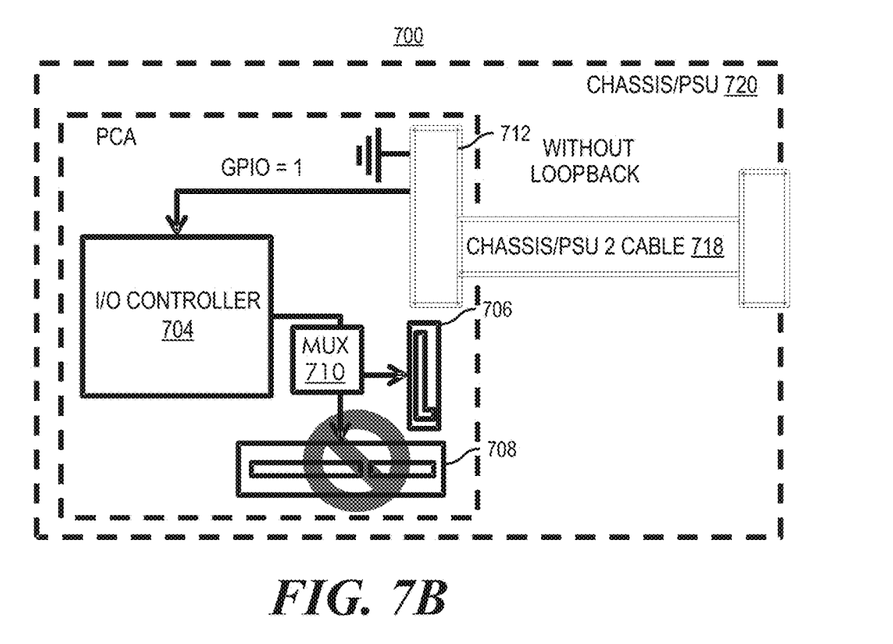

FIGS. 7A and 7B are diagrams of computing systems capable of detecting a system configuration based on the presence of a chassis or power supply, according to various examples. Computing system 700 includes a PCA 702 that includes an I/O controller 704 with a flexible port connected to a first port connector 706 and a second port connector 708 via a multiplexer 710. In this example, a GPIO used to control the flexible port can be based, at least in part, on the chassis and/or power supply used for the computing system 700. The PCA may also include a board connector 712 that can be connected to a chassis and/or power supply.

In the example of FIG. 7A, the board connector 712 can be connected via a chassis and/or power supply cable 714 to a first chassis and/or power supply 716. The cable can include a loopback to connect a pin associated with the GPIO with a state, such as a ground state. As such, the loopback changes the state of the GPIO to 0. This can provide information to a system configuration detection module about the chassis and/or power supply (PSU). In one example, the GPIO can represent that the chassis has a slot to enable the second port connector 708. In another example, the GPIO can represent that the power supply has enough power to enable the second port connector 708. This can be used to change default configuration parameters of the flexible port. For example, the first port connector to be looked at for a desired I/O configuration may be the second port connector 708 because of the GPIO. In certain other examples, the GPIO can be used to select the flexible port configuration and/or to disable one of the possible configurations for the flexible port configuration.

In the example of FIG. 7B, a chassis and/or PSU cable 718 is connected to a second chassis and/or power supply 720. This chassis/PSU cable 718 does not have a loopback to connect the GPIO pin of the board connector 712 to ground. As such, the GPIO input is set to a state of one. The state can tell a system configuration detection module about other information associated with the chassis and/or power supply. In one example, the GPIO can represent that the chassis does not have a slot to enable the second port connector 708. In another example, the GPIO can represent that the power supply does not have enough power to enable the second port connector 708. Further, this can be used to change default configuration parameters of the flexible port and/or multiplexer 710. For example, the system configuration detection module can determine a desired configuration based on a preference to a protocol associated with the first port connector 706 because of the information about the second port connector 708.

Figure 8:
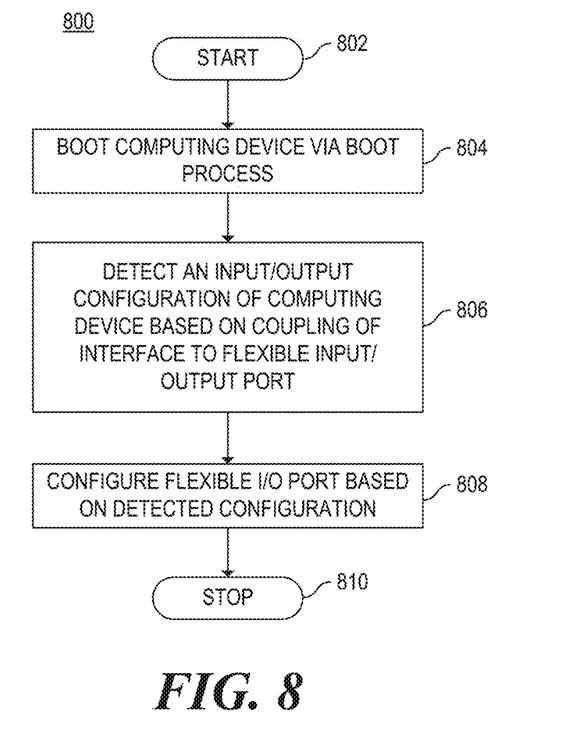
FIG. 8 is a flowchart of a method for configuring a flexible input/output port based on a detected configuration of a computing system, according to one example.

FIG. 8 is a flowchart of a method for configuring a flexible input/output port based on a detected configuration of a computing system, according to one example. Although execution of method 800 is described below with reference to computing device 100, other suitable components for execution of method 800 can be utilized. Method 800 may be implemented in the form of executable instructions stored on a machine-readable storage medium, such as storage medium 132, and/or in the form of electronic circuitry.

Method 800 may start at 802 and proceed to 804, where the computing device may be booted via a boot process. During the boot process, a flexible port 140 or multiple flexible ports of an I/O controller 110 can be configured.

The method 800 can continue to 806 where, during the boot process, an I/O configuration of the computing device is detected based on a coupling of an interface to a flexible input/output port. The detected I/O configuration can be a desired I/O configuration, for example, a configuration intended based on the system components at boot time. As noted above, the detected configuration can be based on a trial and error system of searching for connected peripheral devices or based on state information received from coupling information about the interface.

In one example, the coupling information received representing a first state shows that no device or component has been coupled to the interface while coupling information received representing a second state shows that a device or component has been coupled. In certain embodiments, the states can represent particular desired system I/O configurations. In one example, the state information can be used to determine whether the configuration is associated with a first daughter card or a second daughter card. Examples of methods to detect state information can be found in FIGS. 2A-7B. Further, as noted above, multiple flexible I/O ports may be configured using these techniques.

In another example, the coupling information is based on the trial and error system. As such, a system configuration detection module 112 can set a multiplexer 116 connected to the flexible port 140 to communicate via a first interface. The flexible port 140 can also be configured to communicate via the first interface. Then a component discovery process can be performed on the first interface to determine if a peripheral device is connected. If a peripheral device is detected, the desired I/O configuration for the computing device 100 can be determined to use the first interface. If it is determined that a peripheral device is not detected via the first interface, the multiplexer 116 can be set to communicate with a second interface and the flexible port 140 can be set to work with the second interface. In certain scenarios, this can be a default condition if the peripheral device was not found on the first interface. In other scenarios, a second component discovery process can be performed on the second interface. If a peripheral device is found on the second interface, the desired I/O configuration can be considered to use the second interface. In another embodiment, if the peripheral device is not found, other iterations of changing the multiplexer 116 and checking the connected interface can occur. Further, a default configuration (e.g., use the first interface, use the second interface, etc.) can be selected as the intended or desired configuration based on the lack of a peripheral device on the buses.

Then, at 808, the flexible port 140 can be configured based on the detected desired I/O configuration. As such, the flexible port 140 can be configured to conform to a protocol associated with an interface associated with the detected configuration. As noted, the desired I/O configuration can be based on GPIO, trial and error, or a combination thereof.

Then, at 810, the method 800 can stop. The computing device 100 can continue to perform other functionality. For example, the boot process can perform other startup features, such as handing off control of the computing device 100 to an operating system.

With the approaches above, a manufacturer of a printed circuit assembly can use a flexible I/O port with various configurations. As such, I/O configuration can be performed by automatically detecting a system configuration at boot time instead of setting I/O configuration at PCA manufacture or using manual configuration. This can allow a PCA manufacturer to reuse the same PCA for varying systems. This implementation can also allow the manufacturer to reuse a PCB and/or PCA for various systems.

What is claimed is:

1. A computing device comprising:
an input/output controller including:
a flexible port coupled to a first port connector, and
an additional port coupled to a second port connector;
a switch to be actuated when a component is inserted into a drive bay of the computing device;
a system configuration detection module to detect a desired input/output configuration of the computing device based on actuation of the switch; and
a port configuration module to configure the flexible port based on the detected desired input/output configuration,
wherein based on the component having been inserted, the port configuration module is to configure the flexible port to use a first protocol associated with the first port connector to communicate with the component, and the additional port is to communicate with the second port connector using a second protocol associated with the second port connector, and
wherein based on the component not having been inserted, the port configuration module is to configure the flexible port to use the second protocol to communicate with the second port connector and connect additional physical data lines associated with the flexible port to the second port connector to provide a bus with expanded bandwidth capacity, the bus to communicatively couple the second port connector and the input/output controller, and the additional port is to communicate with the second port connector using the second protocol.

2. The computing device of claim 1, further comprising:
a multiplexer, wherein a bus associated with the flexible port is connected to the multiplexer,
wherein the multiplexer is further connected to the first port connector and a third port connector,
wherein the port configuration module configures the flexible port to communicate using the first protocol,
wherein the system configuration detection module selects the first port connector to connect to the bus and causes the flexible port to perform a component discovery process based on the first protocol, and
wherein the port configuration module configures the flexible port based on the component discovery process.

3. The computing device of claim 2,
wherein the component discovery process determines an absence of a connected component,
wherein the system configuration detection module configures the flexible port to communicate using a third protocol and causes the flexible port to perform a second component discovery process based on the third protocol, and
wherein the port configuration module selects the third port connector to connect to the bus based on the second component discovery process.

4. The computing device of claim 1, further comprising:
a general purpose input connected to the switch that is actuated when the component is installed,
wherein the detection of the desired input/output configuration is based on the general purpose input.

5. The computing device of claim 1, wherein the additional port is coupled to the second port connector by a first data lane, and wherein the port configuration module is to provide the bus with expanded bandwidth capacity by providing the additional physical data lines as a second data lane.

6. The computing device of claim 5, wherein the port configuration module is to provide the bus with expanded bandwidth capacity by providing a Peripheral Component Interconnect Express bus with an additional data lane.

7. The computing device of claim 1, further comprising a multiplexer, wherein the port configuration module instructs the multiplexer to connect the additional physical data lines to the second port connector.

8. The computing device of claim 7, wherein the multiplexer disconnects the additional physical data lines from the first port connector to connect the additional physical data lines to the second port connector.

9. A method comprising:
  booting a computing device via a boot process;
  during the boot process, detecting an input/output configuration of the computing device based on actuation of a switch, the switch to be actuated when a component is inserted into a drive bay of the computing device; and
  configuring a flexible input/output port based on the detected input/output configuration,
  wherein configuring the flexible input/output port comprises connecting the flexible input/output port to a connector connected to another port to provide expanded bandwidth capacity to the connector and configuring the flexible input/output port to use a protocol associated with the connector based on the component not having been inserted, wherein the other port is to use the protocol associated with the connector.

10. A non-transitory machine-readable storage medium storing instructions that, if executed by at least one processor of a device, cause the device to:
  initiate a boot process to boot the device;
  during the boot process, detect a desired input/output configuration of the device based on actuation of a switch, the switch to be actuated when a component is inserted into a drive bay of the computing device;
  based on the component not having been inserted, configure a flexible input/output port to conform to a protocol associated with a connector associated with another port and instruct a multiplexer to connect data wires associated with the flexible input/output port to the connector associated with the other port to provide expanded bandwidth capacity to the connector associated with the other port, the other port to conform to the protocol associated with the connector; and
  based on the component having been inserted, configure the flexible input/output port to conform to a protocol associated with a connector associated with the drive bay, the other port to conform to the protocol associated with the connector.

* * * * *